(12) United States Patent
Suh et al.

(10) Patent No.: US 10,298,365 B2
(45) Date of Patent: May 21, 2019

(54) SYSTEM AND METHOD FOR ORTHOGONAL FREQUENCY DIVISION MULTIPLE ACCESS (OFDMA) RESOURCE ALLOCATION

(71) Applicant: Huawei Technologies Co., Ltd., Shenzhen (CN)

(72) Inventors: Jung Hoon Suh, Kanata (CA); Phillip Barber, McKinney, TX (US); Osama Aboul-Magd, Kanata (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/738,411

(22) Filed: Jun. 12, 2015

(65) Prior Publication Data

US 2015/0365203 A1  Dec. 17, 2015

Related U.S. Application Data

(60) Provisional application No. 62/011,475, filed on Jun. 12, 2014, provisional application No. 62/020,902, (Continued)

(51) Int. Cl.
*H04W 4/00* (2018.01)
*H04L 5/00* (2006.01)
(Continued)

(52) U.S. Cl.
CPC .......... *H04L 5/0007* (2013.01); *H04L 1/0009* (2013.01); *H04L 5/0048* (2013.01);
(Continued)

(58) Field of Classification Search
None
See application file for complete search history.

(56) References Cited

U.S. PATENT DOCUMENTS 7,742,392 B2   6/2010  Ge et al.
8,125,885 B2   2/2012  Bertrand et al.
(Continued)

FOREIGN PATENT DOCUMENTS

CN   101299836 A   11/2008
CN   101547170 A   9/2009
(Continued)

OTHER PUBLICATIONS

International Search Report of Patent Cooperation Treaty (PCT), International Application No. PCT/US2015/35616, Applicant Huawei Technologies Co., Ltd., dated Sep. 15, 2015, 6 pages.
(Continued)

*Primary Examiner* — Zewdu A Beyen
(74) *Attorney, Agent, or Firm* — Slater Matsil, LLP

(57) ABSTRACT

An orthogonal frequency division multiple access (OFDMA) frame includes a 256 tone payload. The 256 tone payload may consist of either 234 data tones when the payload is carried in a downlink transmission. The 256 tone payload may consist of 216 data tones when the payload is carried in an uplink transmission. In addition, the OFDMA frame may include one or more resource units (RUs). Each of the one or more RUs may consist of either an integer multiple of 26 data tones or an integer multiple of 24 data tones and 2 pilot tones. Another embodiment OFDMA frame comprises a symbol-based RU (SRU) that may include an integer multiple of 2 pilots tones and either an integer multiple of 24 data tones or an integer multiple of 26 data tones.

16 Claims, 8 Drawing Sheets

Related U.S. Application Data filed on Jul. 3, 2014, provisional application No. 62/028,208, filed on Jul. 23, 2014.

(51) Int. Cl.
*H04W 72/04* (2009.01)
*H04L 1/00* (2006.01)
*H04L 27/26* (2006.01)
*H04W 84/12* (2009.01)

(52) U.S. Cl.
CPC ........ *H04L 5/0053* (2013.01); *H04L 27/2602* (2013.01); *H04W 72/0453* (2013.01); *H04L 27/2636* (2013.01); *H04W 84/12* (2013.01)

(56) References Cited

U.S. PATENT DOCUMENTS

| | | |
|---|---|---|
| 8,437,440 B1 | 5/2013 | Zhang et al. |
| 8,571,010 B1 | 10/2013 | Zhang et al. |
| 9,722,740 B2 | 8/2017 | Suh et al. |
| 2005/0259569 A1 | 11/2005 | Cimini, Jr. et al. |
| 2005/0286408 A1 | 12/2005 | Jin et al. |
| 2006/0279435 A1 | 12/2006 | Krishnan et al. |
| 2007/0297323 A1 | 12/2007 | Seki |
| 2008/0232239 A1 | 9/2008 | Mujtaba et al. |
| 2008/0303508 A1 | 12/2008 | Kwak et al. |
| 2009/0080388 A1 | 3/2009 | Rohfleisch et al. |
| 2009/0225888 A1 | 9/2009 | Noh et al. |
| 2010/0040159 A1 | 2/2010 | Lee et al. |
| 2010/0080114 A1 | 4/2010 | Ratnam et al. |
| 2010/0111220 A1 | 5/2010 | Rouquette-Leveil et al. |
| 2010/0316042 A1 | 12/2010 | Hirakawa |
| 2011/0013532 A1 | 1/2011 | Wu et al. |
| 2011/0032875 A1 | 2/2011 | Erceg et al. |
| 2011/0038324 A1 | 2/2011 | Park et al. |
| 2011/0051636 A1 | 3/2011 | Van Nee et al. |
| 2012/0008571 A1 | 1/2012 | Li et al. |
| 2012/0039406 A1 | 2/2012 | Srinivasa et al. |
| 2012/0106450 A1 | 5/2012 | Golitschek Edler Von Elbwart et al. |
| 2012/0127940 A1 | 5/2012 | Lee et al. |
| 2012/0263157 A1 | 10/2012 | Porat |
| 2013/0121244 A1 | 5/2013 | Vermani et al. |
| 2013/0170440 A1 | 7/2013 | Tavildar et al. |
| 2013/0216002 A1 | 8/2013 | Suh et al. |
| 2013/0235773 A1 | 9/2013 | Wang et al. |
| 2013/0243115 A1 | 9/2013 | Taghavi Nasrabadi et al. |
| 2013/0266086 A1 | 10/2013 | Yang et al. |
| 2014/0057637 A1* | 2/2014 | Hoang ............... H04W 56/0045 455/445 |
| 2015/0063334 A1 | 3/2015 | Vermani et al. |
| 2015/0139119 A1 | 5/2015 | Azizi et al. |
| 2015/0146653 A1 | 5/2015 | Zhang et al. |
| 2015/0236880 A1 | 8/2015 | Zhang et al. |
| 2015/0312077 A1 | 10/2015 | Porat |
| 2015/0327276 A1 | 11/2015 | Rebeiz et al. |
| 2015/0334708 A1* | 11/2015 | Lee ................... H04W 72/0446 370/329 |
| 2015/0349995 A1 | 12/2015 | Zhang et al. |
| 2015/0365203 A1 | 12/2015 | Suh et al. |
| 2015/0365257 A1 | 12/2015 | Suh et al. |
| 2015/0365922 A1 | 12/2015 | Suh et al. |
| 2015/0365947 A1 | 12/2015 | Suh et al. |
| 2016/0301451 A1 | 10/2016 | Seok |
| 2016/0323124 A1 | 11/2016 | Srinivasa et al. |
| 2016/0353370 A1 | 12/2016 | Choi et al. |
| 2018/0062899 A1 | 3/2018 | Zhang et al. |

FOREIGN PATENT DOCUMENTS

| | | |
|---|---|---|
| CN | 101635619 A | 1/2010 |
| CN | 101855851 A | 10/2010 |
| CN | 102357579 A | 2/2012 |
| CN | 102972077 A | 3/2013 |
| CN | 106664187 A | 5/2017 |
| EP | 2357773 A2 | 8/2011 |
| JP | 2009118404 A | 5/2009 |
| JP | 2011511527 A | 4/2011 |
| JP | 2012217114 A | 11/2012 |
| JP | 2013531955 A | 8/2013 |
| JP | 2013535932 A | 9/2013 |
| KR | 20050123041 A | 12/2005 |
| KR | 20080109311 A | 12/2008 |
| WO | 2006092852 A1 | 9/2006 |
| WO | 2012006393 A1 | 1/2012 |
| WO | 2012082306 A2 | 6/2012 |
| WO | 2013033231 A2 | 3/2013 |
| WO | 2013077838 A1 | 5/2013 |
| WO | 2013151869 A1 | 10/2013 |

OTHER PUBLICATIONS

"Draft Standard for Information Technology—Telecommunications and information exchange between systems—Local and metropolitan area networks—Specific requirements; Part 11: Wireless LAN Medium Access Control (MAC) and Physical Layer (PHY) specifications; Amendment 4: Enhancements for Very High Throughput for Operation in Bands below 6 GHz," IEEE P802.11acTM/D3.0, Jun. 2012, 385 pages.

"IEEE Standard for Information technology—Telecommunications and information exchange between systems Local and metropolitan area networks—Specific requirements, Part 11: Wireless LAN Medium Access Control (MAC) and Physical Layer (PHY) Specifications," IEEE Computer Society, IEEE Std 802.11TM-2012, Mar. 29, 2012, 2,793 pages.

"IEEE P802.11 Wireless LANs: Specification Framework for TGax," IEEE 802.11-15/0132r8, Sep. 22, 2015, pp. 1-22. (Specification Framework Documentation on the IEEE 802.11ax).

International Search Report and Written Opinion received in International Application No. PCT/US2015/35696 dated Sep. 11, 2015, 7 pages.

Pascual-Iserte, A., et al., "Residual Carrier Frequency Offset Estimation and Correction in OFDM MIMO Systems," IEEE 18th International Symposium on Personal, Indoor and Mobile Radio Communications, Sep. 3-7, 2007, pp. 1-5.

Haring, L. et al., "Fine Frequency Synchronization in the Uplink of Multiuser OFDM Systems," IEEE Transactions on Communications, Dec. 2009, pp. 3743-3752, vol. 57, No. 12.

Kim, K., et al., "Joint Carrier Frequency Offset and Channel Estimation for Uplink MIMO-OFDMA Systems Using Parallel Schmidt Rao-Blackwellized Particle Filters," IEEE Transactions on Communications, Sep. 2010, pp. 2697-2708, vol. 58, No. 9.

Fang, J., et al., "Fine-Grained Channel Access in Wireless LAN", IEEE/ACM Transactions on Networking, vol. 21, No. 3, Jun. 2013, 16 Pages.

\* cited by examiner

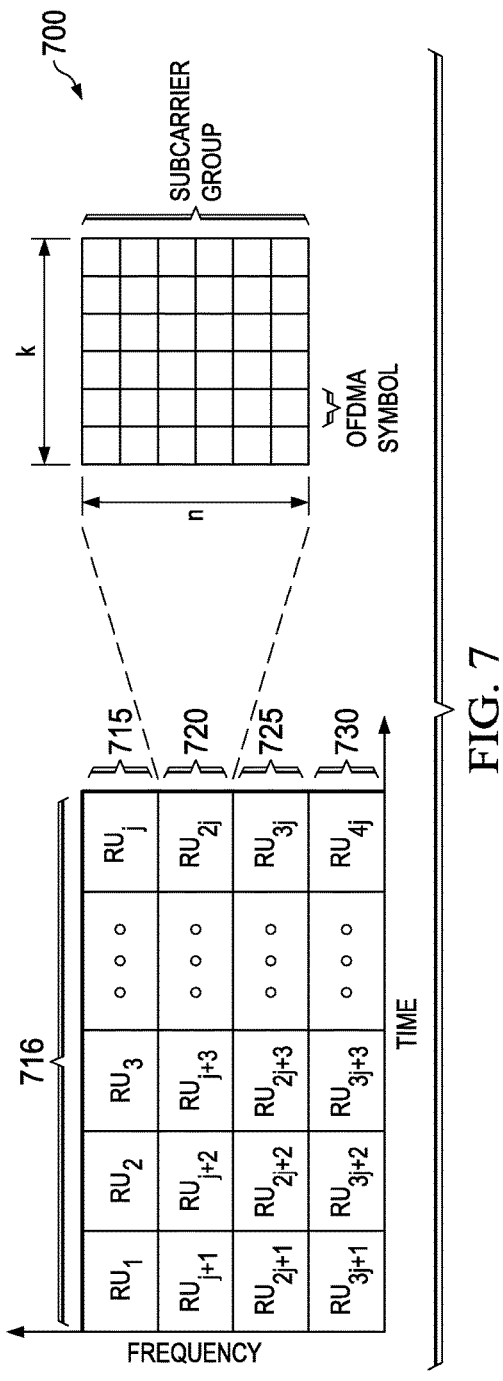
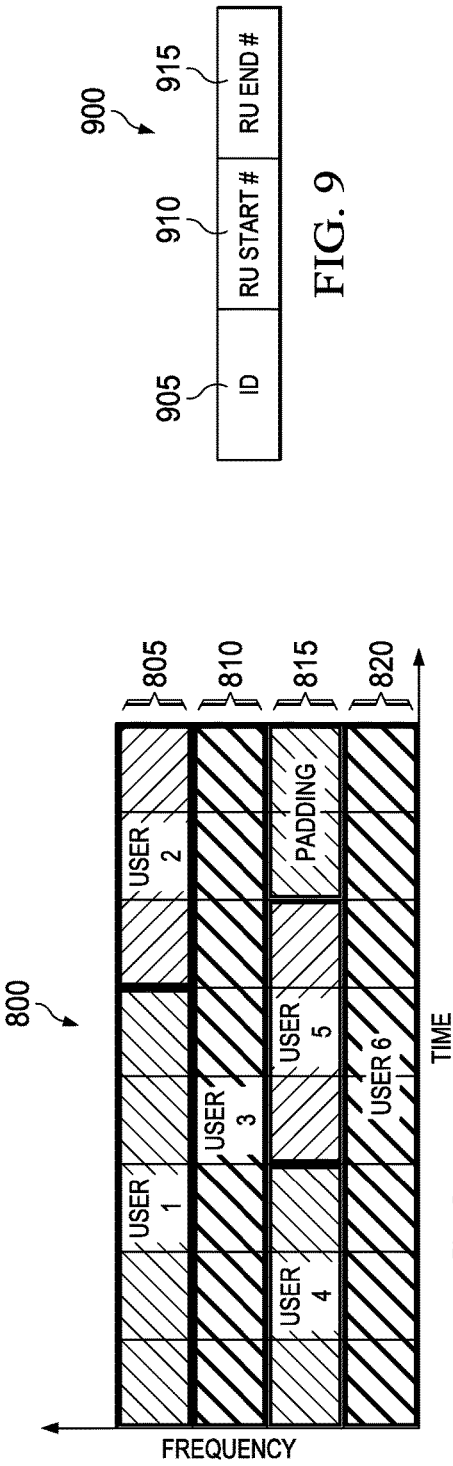
FIG. 7
FIG. 8
FIG. 9

SYSTEM AND METHOD FOR ORTHOGONAL FREQUENCY DIVISION MULTIPLE ACCESS (OFDMA) RESOURCE ALLOCATION

This patent application claims priority to U.S. Provisional Patent Application No. 62/011,475, filed on Jun. 12, 2014 and entitled "System and Method for OFDMA Tone Allocation in Next Generation Wi-Fi Networks," to U.S. Provisional Application No. 62/020,902, filed on Jul. 3, 2014 and entitled "System and Method for Orthogonal Frequency Division Multiple Access" and to U.S. Provisional Application No. 62/028,208, filed on Jul. 23, 2014 and entitled "System and Method for OFDMA Resource Allocation," each of which are hereby incorporated by reference herein as if reproduced in their entireties.

TECHNICAL FIELD

The present invention relates to a system and method for wireless communications, and, in particular embodiments, to a system and method for orthogonal frequency division multiple access (OFDMA) resource allocation.

BACKGROUND

Next generation Wireless Local Area Networks (WLANs) will be deployed in high-density environments that include multiple access points providing wireless access to large numbers of mobile stations in the same geographical area. Next-generation WLANs will also need to simultaneously support various traffic types having diverse quality of service (QoS) requirements, as mobile devices are increasingly used to access streaming video, mobile gaming, and other services. Institute of Electrical and Electronics Engineers (IEEE) 802.11ax is being developed to address these challenges, and is expected to provide up to four times the throughput of IEEE 802.11ac networks.

SUMMARY OF THE INVENTION

Technical advantages are generally achieved, by embodiments of this disclosure which describe system and method for OFDMA resource allocation.

In accordance with an embodiment, a method for transmitting data in a wireless network is provided. In this example, the method includes generating an orthogonal frequency division multiple access (OFDMA) frame that includes a 256 tone payload consisting of 234 tones carried in one or more resource units (RUs) and 22 tones excluded from the one or more RUs. The 22 tones excluded from the one or more RUs include common pilot tones, null tones, reserved tones, or combinations thereof. The method further includes transmitting the generated OFDMA frame to at least one receiver over a 20 megahertz (MHz) frequency channel. An apparatus for performing this method is also provided.

In accordance with another embodiment, a method for communicating scheduling information in a wireless network is provided. In this example, the method comprises transmitting an orthogonal frequency division multiple access (OFDMA) frame carrying a signal (SIG) field and a sequence of resource units (RUs). A subset of RUs in the OFDMA frame are allocated to one or more stations (STAs). Index information embedded in the SIG field associates an identifier (ID) assigned to the one or more STAs with a starting or ending position of the subset of RUs in the sequence of RUs carried by the OFDMA frame. An apparatus for performing this method is also provided.

In accordance with another embodiment, a method for communicating data in a wireless network is provided. In this example, the method comprises transmitting an orthogonal frequency division multiple access (OFDMA) frame to at least one receiver. The OFDMA frame includes a resource unit (RU) consisting of either a multiple of 26 tones or a multiple of 28 tones. An apparatus for performing this method is also provided.

BRIEF DESCRIPTION OF THE DRAWINGS

For a more complete understanding of the present invention, and the advantages thereof, reference is now made to the following descriptions taken in conjunction with the accompanying drawing, in which:

FIG. 7 illustrates a block diagram of an embodiment RU indexing scheme;

FIG. 8 illustrates a diagram of an embodiment RU allocation scheme;

FIG. 9 illustrates a diagram of an embodiment scheduling information frame;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
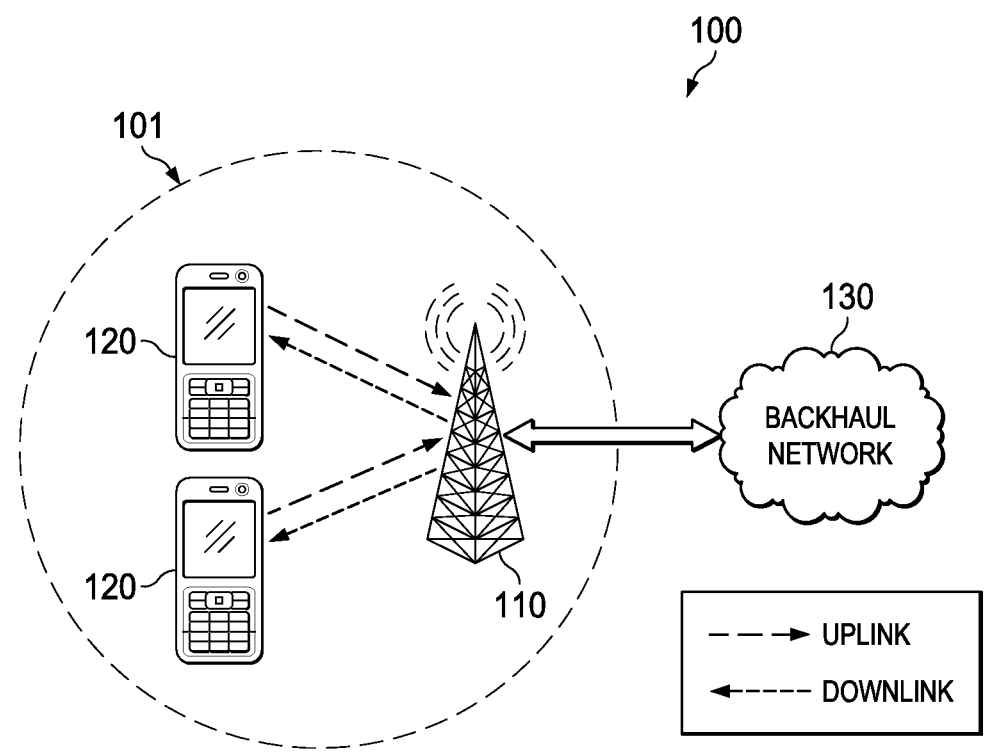
FIG. 1 illustrates a diagram of an embodiment wireless network.

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Aspects of this disclosure provide embodiment frame formats for use in a wireless environment such as an IEEE 802.11ax network. More specifically, the embodiment frame formats specify that an OFDMA frame carries a 256-tone payload consisting of 234 tones carried in one or more resource units (RUs) and 22 tones excluded from the one or more RUs. The 22 tones excluded from the RUs may include common pilot tones, null tones, reserved tones, or combinations thereof. In one example, the 22 tones excluded from the RUs consist of 8 common pilot tones and 14 null tones. In another example, the 22 tones excluded from the RUs consist of 8 reserved tones and 14 null tones. Guard tones are positioned in-between RUs to mitigate interference, while DC tones are empty subcarriers (e.g., subcarriers that do not carry data/information) that are used by mobile devices to locate the center of an OFDM frequency band. In one embodiment, the 22 tones excluded from RUs of the OFDMA frame consist of 8 common pilots and 14 null tones. In another embodiment, the 22 tones excluded from RUs of the OFDMA frame consist of 8 reserved tones and 14 null tones. Reserved tones are tones that are excluded from the RUs, but are not officially designated as null tones or pilot tones. Reserved tones may be used for any purpose. Notably, RUs in an OFDMA frame may generally carry data tones, which are tones that transport payload data. In one embodiment, each RU in an OFDMA frame consists of a multiple of 26 data tones (e.g., 26 data tones, 52 data tones, 78 data tones, etc.). Additionally, RUs in an OFDMA frame may also carry separate pilot tones. In one embodiment, each RU in an OFDMA carries a multiple of 26 tones, with each multiple consisting of 2 pilot tones and 24 data tones. The separate pilot tones carried in an RU may be used to adjust or estimate phase and/or frequency parameters of data tones carried in the RU. For example, in an uplink OFDMA frame carrying RUs transmitted by different mobile devices, the pilot tones carried in the respective RUs may be used by a serving access point to perform residual carrier frequency offset estimation on the uplink OFDMA frame. Residual frequency offset compensation may include estimating a carrier frequency offset based on dedicated pilots carried in OFDMA transmissions. For uplink (UL) OFDMA transmissions, residual carrier frequency offset compensation may allow the access point to track a phase of each symbol based on pilots carried in resource units (RUs).

Embodiments of this disclosure further provide symbol based RU tone allocation schemes in which an RU carried in an OFDMA frame consists of a multiple of either 26 or 28 tones. In one embodiment, the RU consists of a multiple of 26 tones, with each multiple of 26 tones consisting of 24 data tones and 2 pilot tones. In another embodiment, the RU consists of a multiple of 28 tones, with each multiple of 28 tones consisting of 26 data tones and 2 pilot tones.

Aspects of this disclosure also provide an embodiment technique for communicating RU allocations to mobile devices receiving an OFDMA frame. More specifically, index information is embedded in a signal (SIG) field of an OFDMA frame. The index information associates IDs assigned to individual stations, or groups of stations, with starting or ending positions for subsets of assigned RUs in a sequence of RUs carried by the OFDMA frame. For example, the indexing information may indicate a leading RU and/or trailing RU in a subset of RUs allocated to a station, and may allow the station to locate the subset of allocated RUs upon receiving the frame. These and other details are described in greater detail below.

FIG. 1 illustrates a wireless network 100 for communicating data. The wireless network 100 includes an access point (AP) 110 which has a coverage area 101, a plurality of mobile devices 120, and a backhaul network 130. The AP 110 may comprise any component capable of providing wireless access by, among other things, establishing uplink (dashed line) and/or downlink (dotted line) connections with the mobile devices 120. For instance, the AP 110 may be a base station, an enhanced base station (eNB), a femtocell, a Wi-Fi AP, and other devices capable of providing wireless access to the mobile devices 120. The mobile devices 120 may comprise any component capable of establishing a wireless connection with the AP 110, such as a mobile station (STA), a user equipment (UE), or other wirelessly enabled devices. The backhaul network 130 may be any component or collection of components that allow data to be exchanged between the AP 110 and a remote end. In some embodiments, there may be multiple such networks, and/or the network may comprise various other wireless devices, such as relays, low power nodes, etc.

Figure 2:
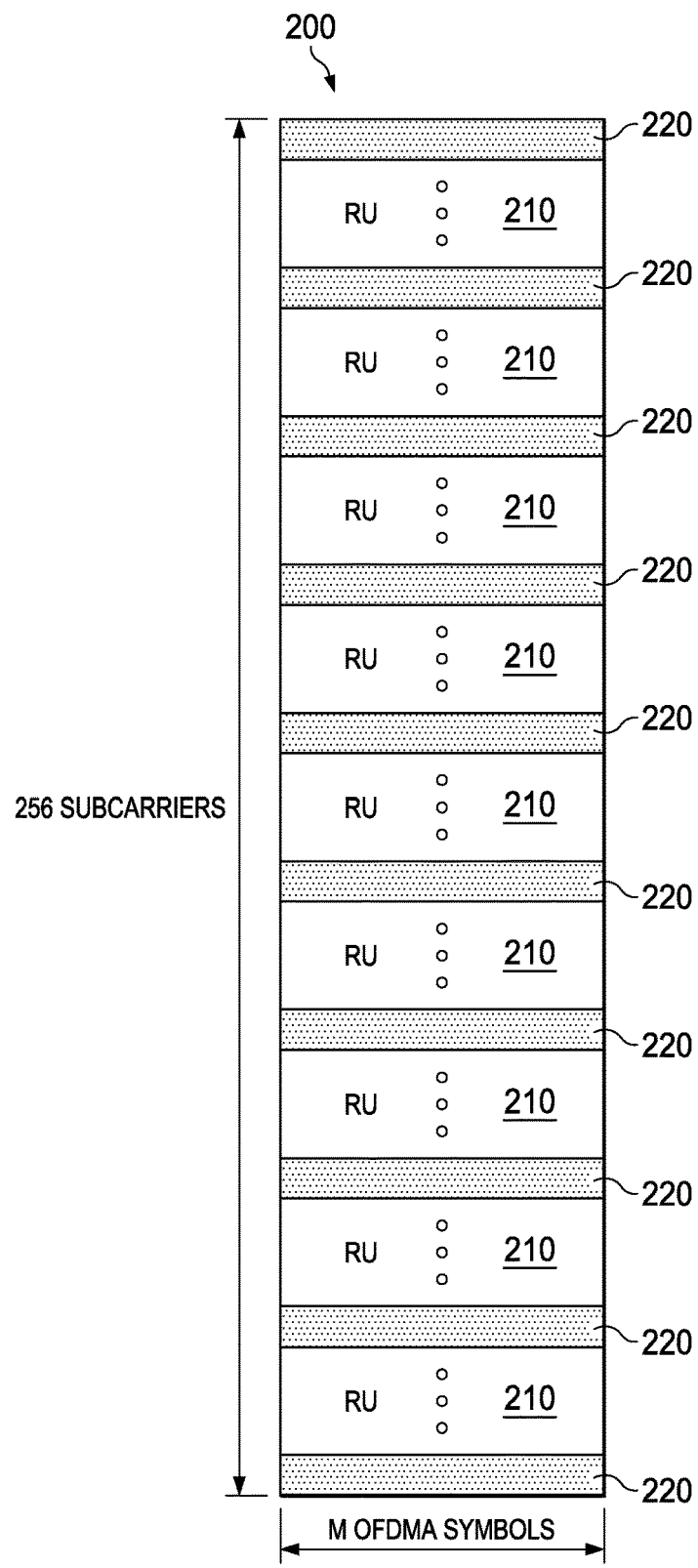
FIG. 2 illustrates a diagram of an embodiment tone allocation scheme for a 256-tone payload.

FIG. 2 is a diagram of an embodiment tone allocation scheme for a 256-tone payload 200 in an OFDMA frame communicated over a 20 MHz frequency channel. As shown, the 256-tone payload 200 includes two-hundred and thirty-four tones carried in RUs 210, and twenty-two tones 220 excluded from the RUs 210. The twenty-two tones 220 excluded from the RUs 210 may include null tones, pilot tones, reserved tones, or combinations thereof. Each of the RUs 210 carried in the 256-tone payload 200 consists of a multiple of 26 tones. In the example provided by FIG. 2, the two-hundred and thirty-four tones are distributed into nine RUs 210 such that each of the RUs consists of 26 tones (i.e., one multiple of 26 tones). However, it should be appreciated that the two-hundred and thirty-four tones may be distributed into fewer RUs. For example, the two-hundred and thirty-four tones may be distributed into three 78-tone RUs. It should also be appreciated that the two-hundred and thirty-four tones may be unevenly distributed into the RUs 210 such that at least two RUs in the 256-tone payload 200 are different sizes. In one example, the two-hundred and thirty-four tones are distributed into four 52-tone RUs and one 26-tone RU. In another example, the two-hundred and thirty-four tones are distributed into two 104-tone RUs and one 26-tone RU. In yet another example, all of the two-hundred and thirty-four tones are distributed into a single RU. Other configurations are also possible. It should also be appreciated that the twenty-two tones 220 excluded from the RUs 210 may be arranged in any location, or set of locations, within the 256-tone payload 200. For example, each of the twenty-two tones 220 could be positioned in a contiguous portion of the 256-tone payload 200, e.g., in the center, top, or bottom portion of the 256-tone payload. As another example, the twenty-two tones 220 could be distributed evenly, or unevenly, across the 256-tone payload 200, e.g., in-between the RUs 220, etc.

Figure 3:
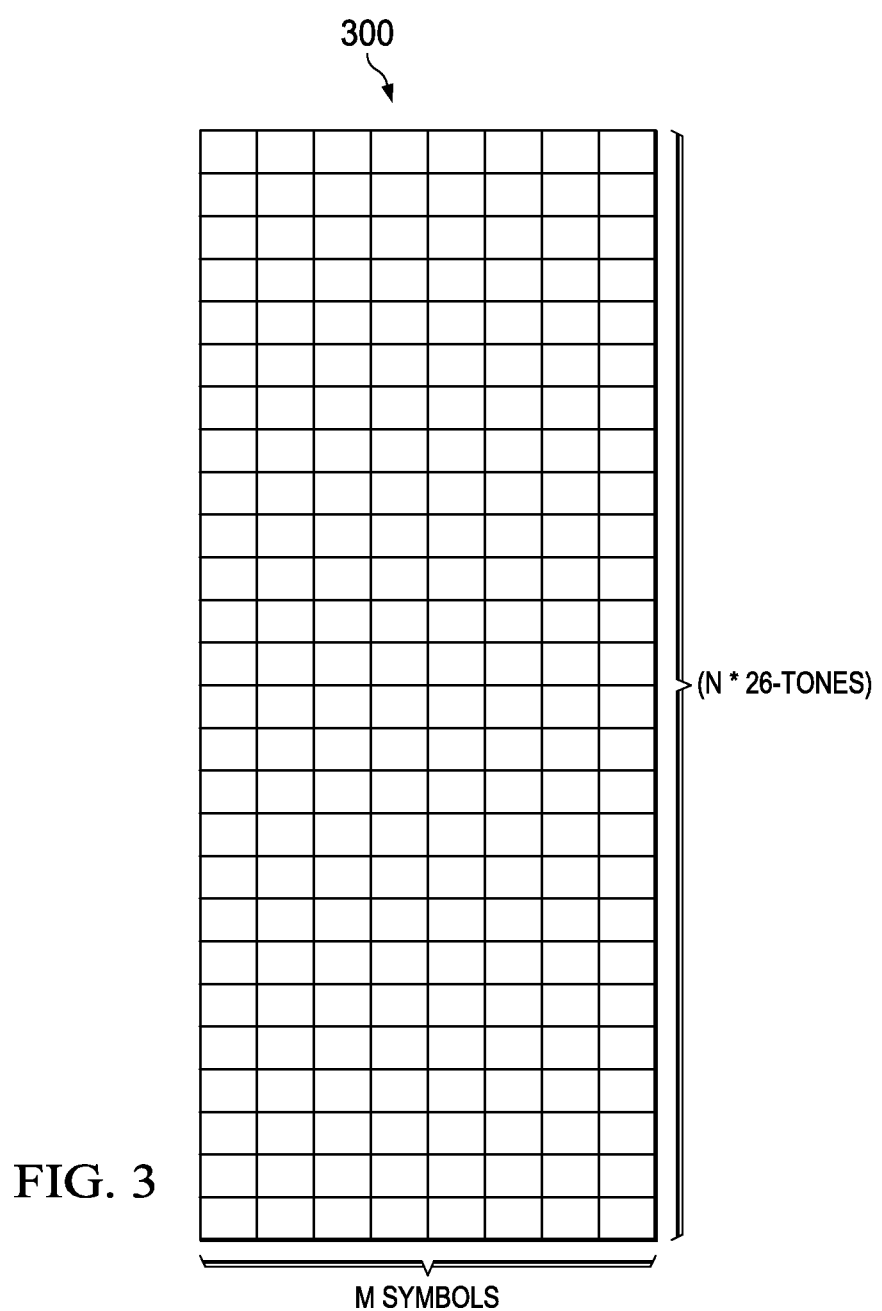
FIG. 3 illustrates a diagram of an embodiment tone allocation scheme for an OFDMA resource unit (RU)

FIG. 3 illustrates a diagram of an embodiment tone allocation scheme for an OFDMA resource unit (RU) 300. As shown, the RU 300 consists of a multiple of 26 tones (N*26-tones) in the frequency domain (where N≥1). The RU 300 may span any number of symbols (M symbols) in the time domain (where M≥1). In one example, the RU 300 spans 8 symbols in the time-domain. In some embodiments, each multiple of 26 tones in the RU 300 consists entirely of data tones. In other embodiments, each multiple of 26 tones in the RU 300 consists of both pilot and data tones, e.g., one pilot and 25 data tones, two pilots and 24 data tones, etc. In such embodiments, the pilot tones may be used for phase tracking.

Figure 4:
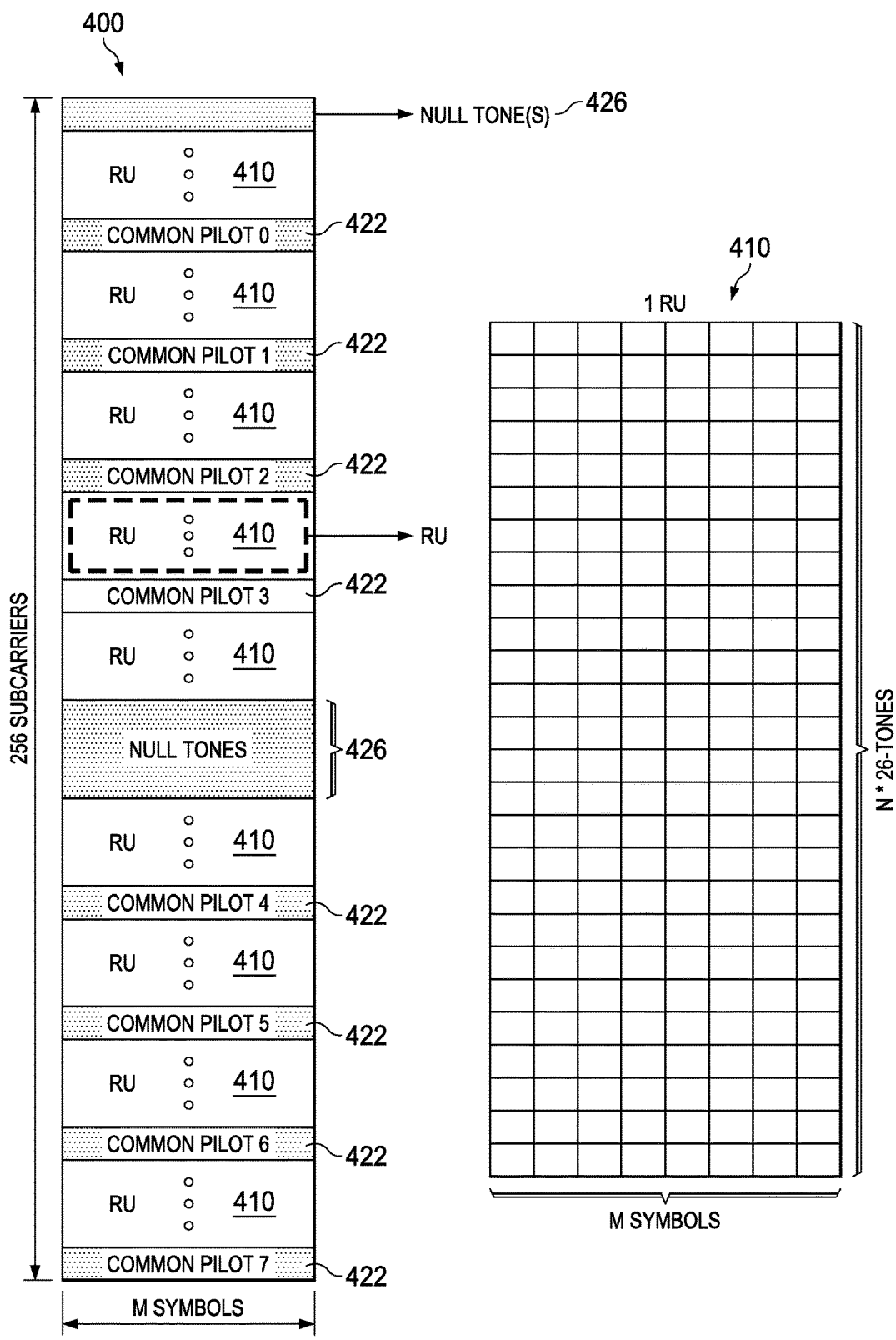
FIG. 4 illustrates a diagram of an embodiment tone allocation scheme for a 256-tone payload for a downlink OFDMA frame.

FIG. 4 illustrates a diagram of an embodiment tone allocation scheme for a 256-tone payload 400 in an OFDMA frame communicated over a 20 MHz frequency channel. As shown, the 256-tone payload 400 includes two-hundred and thirty-four tones carried in RUs 410, 8 common pilot tones 422, and 14 null tones 426. The common pilot tones 422 and the null tones 426 are excluded from the RUs 410. In one example, the 14 null tones 426 consist of 13 guard tones and 1 DC tone. In other examples, the 14 null tones 426 include multiple DC tones and 12 or fewer guard tones. Each of the RUs 410 consists of a multiple of 26 data tones. In one embodiment, the 256-tone payload 400 is carried in a downlink OFDMA frame.

Figure 5:
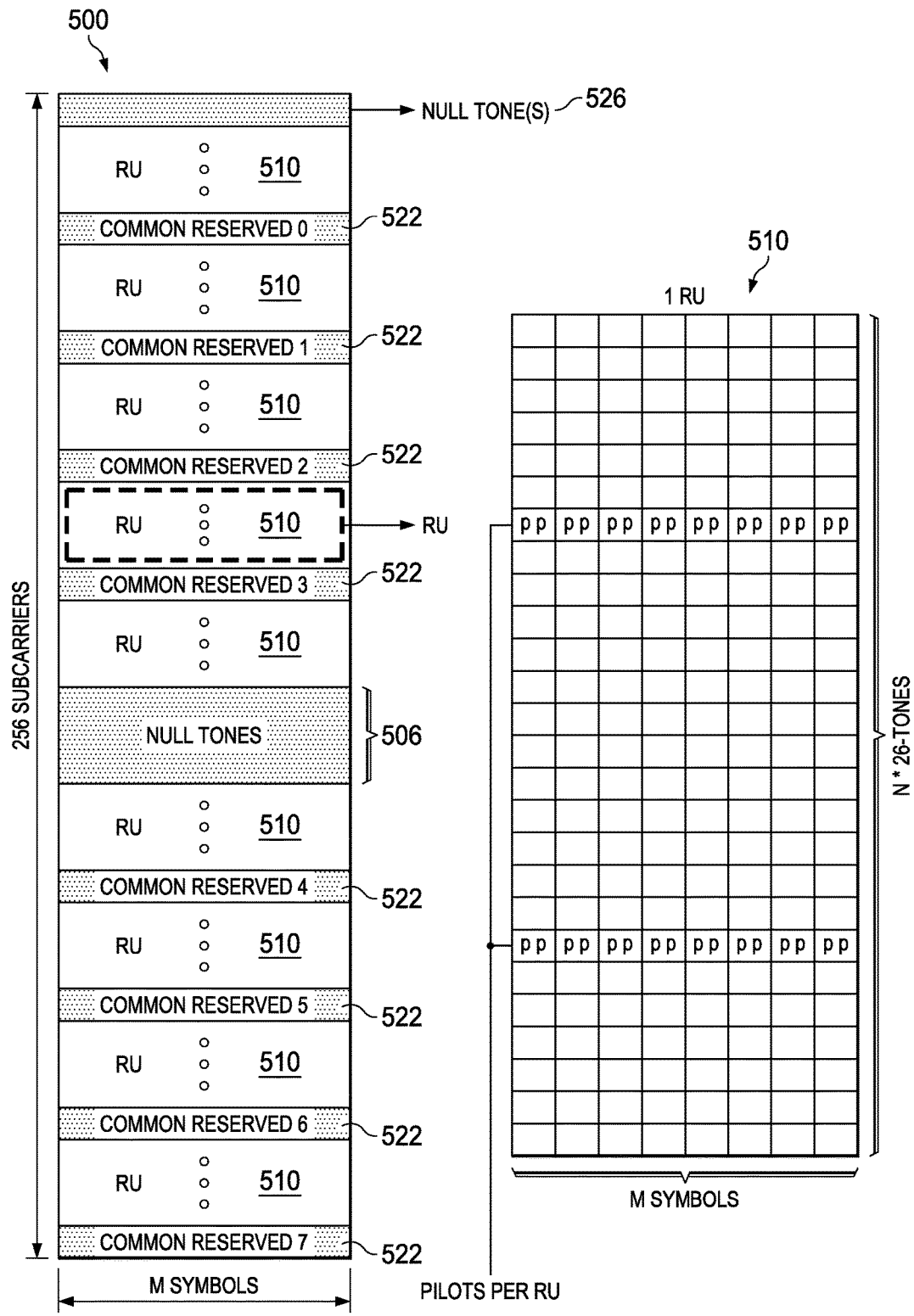
FIG. 5 illustrates a diagram of an embodiment tone allocation scheme for a 256-tone payload for an uplink OFDMA frame.

FIG. 5 illustrates a diagram of another embodiment tone allocation scheme for a 256-tone payload 500 in an uplink OFDMA frame communicated over a 20 MHz frequency channel. As shown, the 256-tone payload 500 includes two-hundred and thirty-four tones carried in RUs 510, 8 reserved tones 522, and 14 null tones 526. The reserved tones 522 and the null tones 526 are excluded from the RUs 510. In one example, the 14 null tones 526 consist of 13 guard tones and 1 DC tone. In other examples, the 14 null tones 526 consist of multiple DC tones and fewer than 13 guard tones, e.g., 2 DC tones+12 guard tones, 3 DC tones+11 guard tones, etc. Each of the RUs 510 consists of a multiple of 26 tones, with each multiple of 26 tones consisting pilot tones and data tones. In the example configuration depicted by FIG. 5, each multiple of 26 tones in a given one of the RUs 510 consists of two pilot tones and twenty-four data tones (2 pilots+24 data tones). It should be appreciated that other configurations are also possible, e.g., 1 pilot+25 data tones, 3 pilots+23 data tones, etc. In the example configuration depicted by FIG. 5, the 8 reserved tones 522 are evenly distributed over the 256-tone payload 500. In such an example, the reserved tones 522 may serve as guard bands between RUs in the uplink OFDMA frame. It should be appreciated that the 8 reserved tones 522 may be distributed differently (e.g., unevenly) in the 256-tone payload 500, and that two or more of the reserved tones 522 may be positioned in a contiguous portion of the 256-tone payload 500. It should also be appreciated that the reserved tones 522 may be used for other purposes. In one embodiment, the 256-tone payload 500 is carried in an uplink OFDMA frame.

Figure 6:
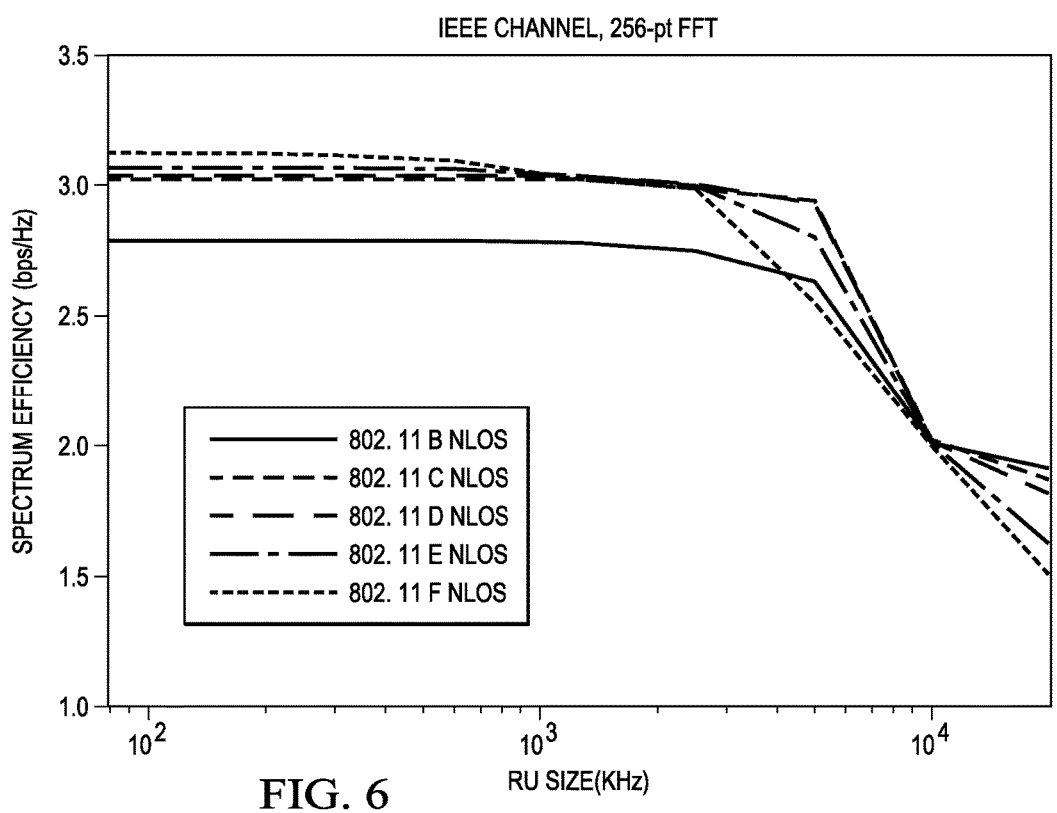
FIG. 6 illustrates simulation results of spectrum efficiency for different RU sizes.

FIG. 6 illustrates simulation results of spectrum efficiency for different size resource units (RUs). The simulation was performed to evaluate how spectrum efficiency was affected by the size of resource units carried in OFDMA frames communicated over different IEEE 802.11 non-line-of-sight (NLOS) channel models. In this example, the simulation was performed over IEEE 802.11 B, C, D, E, and F NLOS channel conditions, which have varying rms delay spreads. As shown, the spectrum efficiency begins to be substantially reduced for all channel conditions as the RU is increased from 10^3 KHz to 10^4 KHz.

FIG. 7 illustrates a block diagram of an embodiment RUs indexing scheme 700. As shown, the RUs indexing scheme 700 comprises a group of subcarriers 715, 720, 725, 730 in the time domain (e.g., OFDMA symbol) and the frequency domain (e.g., subcarrier). More specifically, each of the group of subcarriers 715, 720, 725, 730 comprises a set of RUs having index information that includes a sequence number associated with the set of RUs in the time domain. The number of RUs that are embedded in an OFDMA frame depends on the number of OFDMA symbols (k) and the number of subcarriers (n). In an embodiment, an index number is sequentially allocated to RUs that are located in different groups of subcarriers. For example, an index number is sequentially allocated to the last RU (e.g., $RU_{4j}$) in the group of subcarriers 730 from the first RU (e.g., $RU_1$) in the group of subcarriers 715. In another embodiment, an index number is sequentially allocated to RUs that are located in the same group of subcarriers. For example, an index number is sequentially allocated to the $RU_j$ from the $RU_1$ in the same group of subcarriers 715.

FIG. 8 illustrates a diagram of an embodiment RU allocation scheme 800. As shown, the RU allocation scheme 800 allocates portions of subcarrier groups (SCGs) 805, 810, 815, 820 to a plurality of users. Different sets of RUs in the SCG 805 are allocated to a first user (user-1) and a second user (user-2). All RUs in the SCG 810 are allocated to a third user (user-3). Different sets of RUs in the SCG 815 are allocated to a fourth user (user-4) and a fifth user (user-5), while some RUs in the SCG 815 carry padding bits (e.g., null RUs) that are not allocated to any users. All RUs in the SCG 820 are allocated to a sixth user (user-6). Specifically, sets of RUs that are located in different SCGs are not allocated to the same user. In some embodiments, individual users may be allocated any number of RUs in a subcarrier group. For instance, in the example depicted by FIG. 8, all RUs in the SCG 820 are allocated to a single user (i.e., user 6). In other embodiment, allocation schemes may restrict the number of RUs that can be allocated to an individual user. In one embodiment, an allocation scheme mandates that no more than two RUs are allocated to an individual user.

FIG. 9 illustrates a diagram of index information 900 for embedding in a signal (SIG) field of an OFDM frame. As shown, the scheduling information 900 comprises an identifier (ID) field 905, an RU start index 910, and an RU end index 915. The ID field 905 may specify an ID assigned to an individual station (e.g., a PAID) or an ID assigned to a group of stations (e.g., a Group ID (GrpID)). The RU start index 910 may specify a starting location (e.g., a leading RU) in a set of RUs allocated to the station or group of stations identified by the ID field 905. The RU start index 915 may specify an ending location (e.g., a trailing RU) in a set of RUs allocated to the station or group of stations may include two or more RUs. A leading RU in the set of RUs may precede (e.g., be positioned in front of) all others RUs in the set of RUs. Likewise, a trailing RU in the set of RUs may follow (e.g., be positioned after) all other RUs in the set of RUs.

Figure 10:
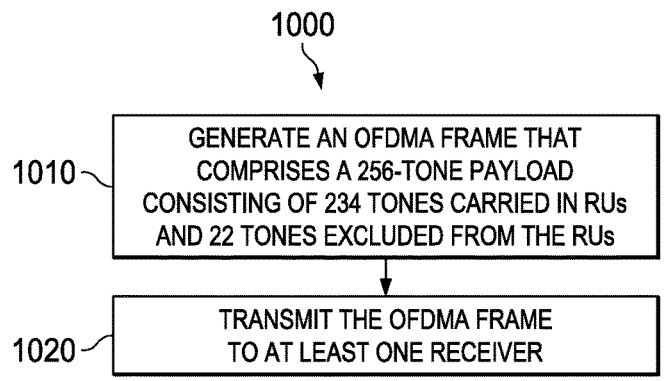
FIG. 10 illustrates a flow chart of an embodiment method for transmitting RUs.

FIG. 10 illustrates a flow chart of an embodiment method 1000 for transmitting RUs. As shown, the method 1000 begins at step 1010, where a transmitter generates an OFDMA frame including a 256-tone payload that consists of two-hundred and thirty-four tones carried in one or more resource units (RUs), and 22 tones excluded from the one or more RUs. The 22 tones excluded from the one or more RUs may consist of 8 common pilot tones and 14 null tones or of 8 reserved tones and 14 null tones. The 14 null tones may consist of guard tones and at least one direct current (DC) tone. In one embodiment, the OFDMA frame is a downlink OFDMA frame, and the 256-tone payload includes 8 pilot tones, 14 null tones, and one or more RUs each of which including an integer multiple of 26 subcarriers. In such an embodiment, the integer multiple of 26 subcarriers include either an integer multiple of 26 data tones or an integer multiple of 24 data tones and 2 pilot tones carrying data to one or more STAs. In another embodiment, the OFDMA frame is an uplink OFDMA frame, and the 256-tone payload includes 8 reserved tones, 14 null tones, and one or more RUs each of which including an integer multiple of 26 subcarriers. In such an embodiment, the integer multiple of 26 subcarriers include an integer multiple of 24 data tones and 2 pilot tones carrying data to one or more STAs. Subsequently, the method 1000 proceeds to step 1020, where the transmitter transmits the OFDMA frame including the one or more RUs to at least one receiver.

In one embodiment, a resource unit (RU) consists of a multiple of 26 tones, with each multiple of 26 tones consisting of 2 pilot tones and 24 data tones. For example, the RU may consist of 2 pilot tones and 24 data tones; 4 pilot tones and 48 data tones; 6 pilot tones and 96 data tones; 8 pilot tones and 192 data tones; or 16 pilot tones and 384 data tones. In another embodiment, a RU consists of a multiple of 28 tones, with each multiple of 28 tones consisting of 2 pilot tones and 26 data tones. For example, the RU may consist of 2 pilot tones and 26 data tones; 4 pilot tones and 52 data tones; 4 pilot tones and 104 data tones; 8 pilot tones and 208 data tones; or 16 pilot tones and 416 data tones. Other combinations are also possible.

Figure 11:
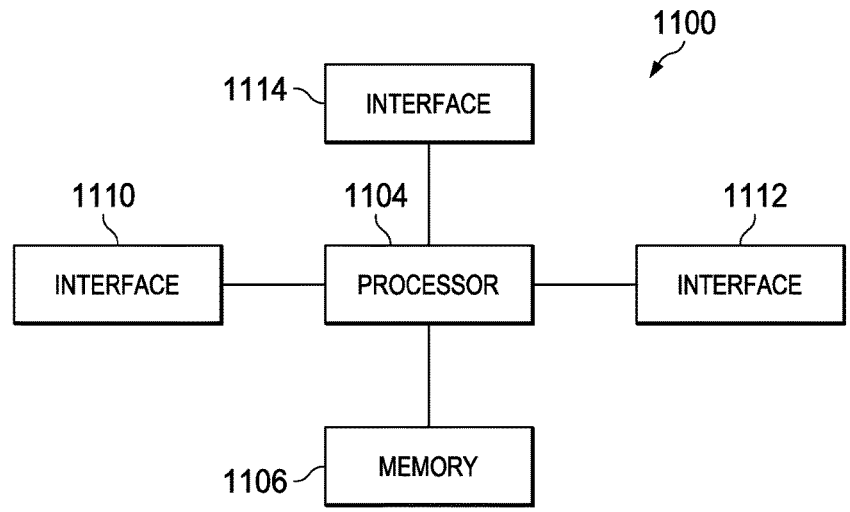
FIG. 11 illustrates a block diagram of an embodiment processing system.

FIG. 11 illustrates a block diagram of an embodiment processing system 1100 for performing methods described herein, which may be installed in a host device. As shown, the processing system 1100 includes a processor 1104, a memory 1106, and interfaces 1110-1114, which may (or may not) be arranged as shown in FIG. 11. The processor 1104 may be any component or collection of components adapted to perform computations and/or other processing related tasks, and the memory 1106 may be any component or collection of components adapted to store programming and/or instructions for execution by the processor 1104. In an embodiment, the memory 1106 includes a non-transitory computer readable medium. The interfaces 1110, 1112, 1114 may be any component or collection of components that allow the processing system 1100 to communicate with other devices/components and/or a user. For example, one or more of the interfaces 1110, 1112, 1114 may be adapted to communicate data, control, or management messages from the processor 1104 to applications installed on the host device and/or a remote device. As another example, one or more of the interfaces 1110, 1112, 1114 may be adapted to allow a user or user device (e.g., personal computer (PC), etc.) to interact/communicate with the processing system 1100. The processing system 1100 may include additional components not depicted in FIG. 11, such as long term storage (e.g., non-volatile memory, etc.).

In some embodiments, the processing system 1100 is included in a network device that is accessing, or part otherwise of, a telecommunications network. In one example, the processing system 1100 is in a network-side device in a wireless or wireline telecommunications network, such as a base station, a relay station, a scheduler, a controller, a gateway, a router, an applications server, or any other device in the telecommunications network. In other embodiments, the processing system 1100 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 12:
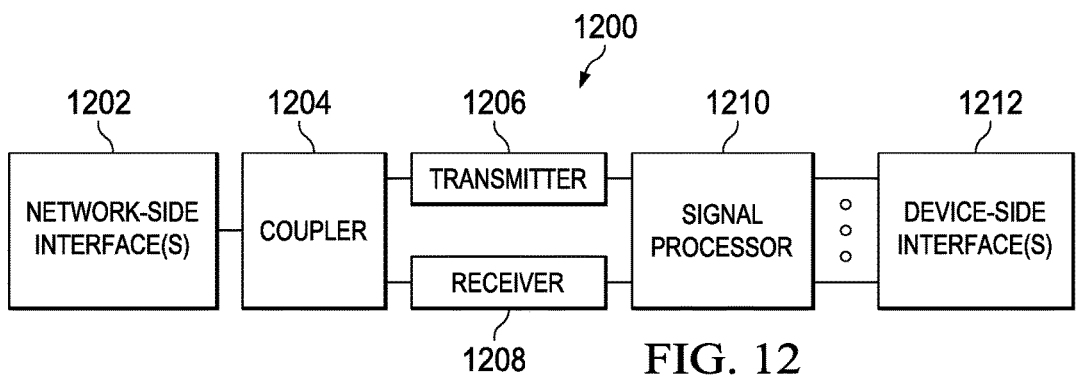
FIG. 12 illustrates a block diagram of an embodiment transceiver.

In some embodiments, one or more of the interfaces 1110, 1112, 1114 connects the processing system 1100 to a transceiver adapted to transmit and receive signaling over the telecommunications network. FIG. 12 illustrates a block diagram of a transceiver 1200 adapted to transmit and receive signaling over a telecommunications network. The transceiver 1200 may be installed in a host device. As shown, the transceiver 1200 comprises a network-side interface 1202, a coupler 1204, a transmitter 1206, a receiver 1208, a signal processor 1210, and a device-side interface 1212. The network-side interface 1202 may include any component or collection of components adapted to transmit or receive signaling over a wireless or wireline telecommunications network. The coupler 1204 may include any component or collection of components adapted to facilitate bi-directional communication over the network-side interface 1202. The transmitter 1206 may include any component or collection of components (e.g., up-converter, power amplifier, etc.) adapted to convert a baseband signal into a modulated carrier signal suitable for transmission over the network-side interface 1202. The receiver 1208 may include any component or collection of components (e.g., down-converter, low noise amplifier, etc.) adapted to convert a carrier signal received over the network-side interface 1202 into a baseband signal. The signal processor 1210 may include any component or collection of components adapted to convert a baseband signal into a data signal suitable for communication over the device-side interface(s) 1212, or vice-versa. The device-side interface(s) 1212 may include any component or collection of components adapted to communicate data-signals between the signal processor 1210 and components within the host device (e.g., the processing system 600, local area network (LAN) ports, etc.).

The transceiver 1200 may transmit and receive signaling over any type of communications medium. In some embodiments, the transceiver 1200 transmits and receives signaling over a wireless medium. For example, the transceiver 1200 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1202 comprises one or more antenna/radiating elements. For example, the network-side interface 1202 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1200 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

The following references are related to subject matter of the present application. Each of these references is incorporated herein by reference in its entirety: [1] U.S. Provisional Patent Application Ser. No. 61/974,282, entitled "UL OFDMA Frame Format and Input/Output Configuration for IFFT module for OFDM(A) Numerologies," filed Apr. 2, 2014; [2] U.S. Provisional Patent Application Ser. No. 62/001,394, entitled "System and Method for Utilizing Unused Tones in Tone-Interleaved Long Training Field," filed May 21, 2014.

What is claimed is:

1. A method for transmitting data in a wireless network, the method comprising:
generating, by a transmitter of an access point (AP), a downlink orthogonal frequency division multiple access (OFDMA) frame that includes a 256 tone payload consisting of 234 tones carried in one or more resource units (RUs) and 22 tones excluded from the one or more RUs, the 22 tones excluded from the one or more RUs including common pilot tones, null tones, reserved tones, or combinations thereof, wherein each of the one or more RUs consists of a multiple of 26 tones; and
transmitting, by the transmitter of the AP, the downlink OFDMA frame to at least one receiver over a 20 megahertz (MHz) frequency channel.

2. The method of claim 1, wherein the 22 tones excluded from the one or more RUs consist of 8 common pilot tones and 14 null tones, the 14 null tones including guard tones and at least one direct current (DC) tone.

3. The method of claim 1, wherein the 22 tones excluded from the one or more RUs consist of 8 reserved tones and 14 null tones, the 14 null tones including guard tones and at least one direct current (DC) tone.

4. The method of claim 1, wherein each multiple of 26 tones being composed of 24 data tones and 2 pilot tones.

5. A transmitter of an access point (AP), the transmitter comprising:
- a processor; and
- a computer readable storage medium storing programming for execution by the processor, the programming including instructions to:
- generate a downlink orthogonal frequency division multiple access (OFDMA) frame that includes a 256 tone payload consisting of 234 tones carried in one or more resource units (RUs) and 22 tones excluded from the one or more RUs, the 22 tones excluded from the one or more RUs including common pilot tones, null tones, reserved tones, or combinations thereof, wherein each of the one or more RUs consists of a multiple of 26 tones; and
- transmit the downlink OFDMA frame to at least one receiver over a 20 megahertz (MHz) frequency channel.

6. The transmitter of claim 5, wherein the 22 tones excluded from the one or more RUs consist of 8 common pilot tones and 14 null tones, the 14 null tones including guard tones and at least one direct current (DC) tone.

7. The transmitter of claim 5, wherein the 22 tones excluded from the one or more RUs consist of 8 reserved tones and 14 null tones, the 14 null tones including guard tones and at least one direct current (DC) tone.

8. The transmitter of claim 5, wherein each multiple of 26 tones being composed of 24 data tones and 2 pilot tones.

9. A method for communicating scheduling information in a wireless network, the method comprising:
- generating, by an access point (AP), an orthogonal frequency division multiple access (OFDMA) frame that includes a signal (SIG) field and a sequence of resource units (RUs), wherein a subset of RUs in the OFDMA frame are allocated to one or more stations (STAs), and wherein index information embedded in the SIG field associates an identifier (ID) assigned to the one or more STAs with a starting or ending position of the subset of RUs in the sequence of RUs carried by the OFDMA frame; and
- transmitting, by the AP, the OFDMA frame over a 20 megahertz (MHz) frequency channel.

10. The method of claim 9, wherein the subset of RUs consists of a leading RU and one or more RUs positioned after the leading RU in the sequence of RUs, and wherein the index information embedded in the SIG field identifies an index associated with the leading RU.

11. The method of claim 9, wherein the subset of RUs consists of a trailing RU and one or more RUs positioned ahead of a leading RU in the sequence of RUs, and wherein the index information embedded in the SIG field identifies an index associated with the trailing RU.

12. The method of claim 9, wherein the sequence of RUs is transmitted on the same subcarrier group (SCG).

13. A non-transitory computer-readable medium having instructions stored thereon that, when executed by an access point (AP), cause the AP to perform operations, the operations comprising:
- generating a downlink orthogonal frequency division multiple access (OFDMA) frame that includes a 256 tone payload consisting of 234 tones carried in one or more resource units (RUs) and 22 tones excluded from the one or more RUs, the 22 tones excluded from the one or more RUs including common pilot tones, null tones, reserved tones, or combinations thereof, wherein each of the one or more RUs consists of a multiple of 26 tones; and
- transmitting the downlink OFDMA frame to at least one receiver over a 20 megahertz (MHz) frequency channel.

14. The non-transitory computer-readable medium of claim 13, wherein the 22 tones excluded from the one or more RUs consist of 8 common pilot tones and 14 null tones, the 14 null tones including guard tones and at least one direct current (DC) tone.

15. The non-transitory computer-readable medium of claim 13, wherein the 22 tones excluded from the one or more RUs consist of 8 reserved tones and 14 null tones, the 14 null tones including guard tones and at least one direct current (DC) tone.

16. The non-transitory computer-readable medium of claim 13, wherein each multiple of 26 tones being composed of 24 data tones and 2 pilot tones.

* * * * *